United States Patent
Lin et al.

(10) Patent No.: US 10,263,537 B2
(45) Date of Patent: Apr. 16, 2019

(54) DC/AC POWER CONVERSION APPARATUS HAVING SWITCHABLE CURRENT PATHS

(71) Applicant: TDK CORPORATION, Tokyo (JP)

(72) Inventors: Min Lin, Tokyo (JP); Ken Matsuura, Tokyo (JP); Hitoshi Kinoshita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/790,354

(22) Filed: Oct. 23, 2017

(65) Prior Publication Data
US 2018/0145608 A1 May 24, 2018

(30) Foreign Application Priority Data
Nov. 21, 2016 (JP) .................................. 2016-226110

(51) Int. Cl.
*H02M 7/48* (2007.01)
*H02M 7/53* (2006.01)
*H02M 7/523* (2006.01)

(52) U.S. Cl.
CPC ......... *H02M 7/523* (2013.01); *H02M 7/4826* (2013.01); *H02M 7/53* (2013.01); *H02M 2007/4815* (2013.01); *Y02B 70/1441* (2013.01)

(58) Field of Classification Search
CPC ................................ H02M 7/523; H02M 3/04
See application file for complete search history.

(56) References Cited

U.S. PATENT DOCUMENTS

| | | | |
|---|---|---|---|
| 3,919,656 A | 11/1975 | Sokal et al. | |
| 7,889,519 B2 | 2/2011 | Perreault et al. | |
| 2006/0279362 A1* | 12/2006 | Chang | H03F 3/191 330/302 |
| 2009/0129134 A1* | 5/2009 | Zijlstra | H02M 7/537 363/131 |

* cited by examiner

*Primary Examiner* — Jue Zhang
*Assistant Examiner* — Trinh Q Dang
(74) *Attorney, Agent, or Firm* — Greenblum & Bernstein, P.L.C.

(57) ABSTRACT

A power conversion apparatus includes: DC input terminals for inputting a DC voltage; AC output terminals for outputting an AC voltage; a switching element; a first resonant capacitance connected across the switching element; a first LC resonance circuit that has an inductance and a capacitance connected in series and is connected together with the switching element between the AC output terminals; and a second LC resonance circuit connected in series together with the switching element between the DC input terminals. The second LC resonance circuit includes a first connector portion connected to one DC input terminal and a second connector portion connected to the switching element, and has a first current path, which includes an inductance, and a second current path, which includes a series circuit with an inductance and a capacitance, formed between the first connector portion and the second connector portion.

12 Claims, 7 Drawing Sheets

DC/AC POWER CONVERSION APPARATUS HAVING SWITCHABLE CURRENT PATHS

FIELD OF THE INVENTION

The present invention relates to a power conversion apparatus.

DESCRIPTION OF THE RELATED ART

A resonant inverter and a resonant converter circuit that have high conversion efficiency are well known examples of an RF power amplifier and power conversion circuit that operate in a high frequency band (see Patent Literature 1 (U.S. Pat. No. 3,919,656) and Patent Literature 2 (U.S. Pat. No. 7,889,519)).

Figure 14:
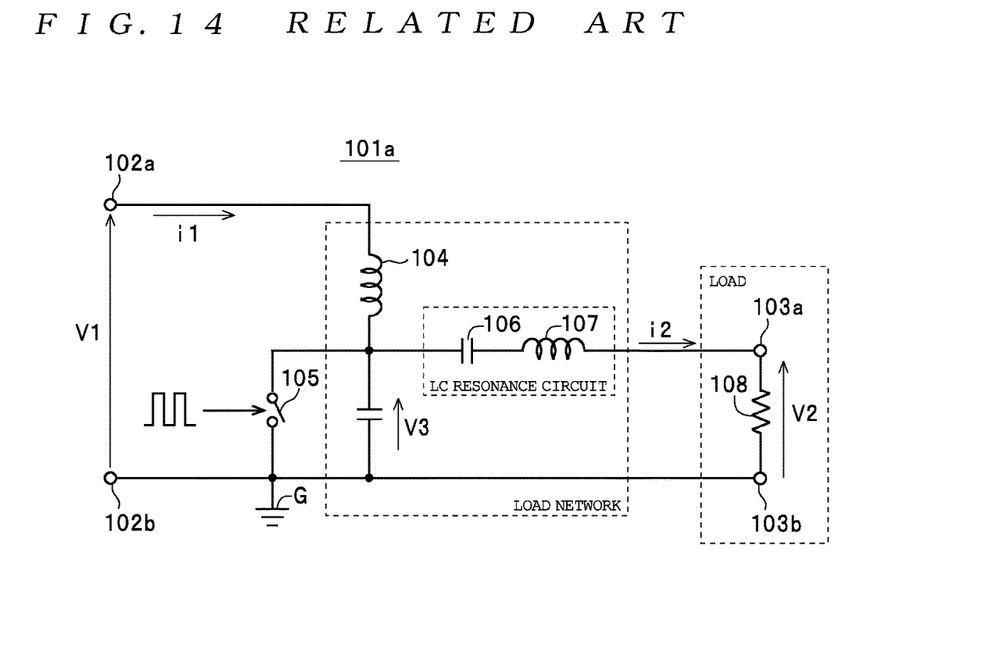
FIG. 14 schematically depicts the circuit configuration of a resonant inverter according to Patent Literature 1.

As depicted in FIG. 14, Patent Literature 1 discloses a resonant inverter 101a which is constructed by a single-ended switching element 105 and a load network, which converts a direct current (DC) input voltage V1 inputted across DC input terminals 102a and 102b to an alternating current (AC) output voltage V2, and outputs from output terminals 103a and 103b to a load resistance 108. The load network includes an inductor 104 as a standalone component connected between the high-potential side DC input terminal 102a (out of the DC input terminals 102a and 102b) and one end of the switching element 105, a capacitance connected across both ends of the switching element 105, and an LC resonance circuit (a series circuit with a capacitance 106 and an inductance 107) connected between the output terminal 103a out of the output terminals 103a and 103b and one end of the switching element 105. The other end of the switching element 105, the low-potential side direct current input terminal 102b, and the output terminal 103b are connected to a common ground G. In this resonant inverter 101a, the voltage V3 of the switching element 105 is decided according to the response characteristics of the load network connected to the switching element 105. During a period where the switching element 105 is off, the voltage V3 applied across both ends of the switching element 105 gradually rises immediately after the switching element 105 is turned off and the rate of change in voltage with respect to the voltage value and time also becomes around zero immediately before the switching element 105 is turned on.

Therefore, in the resonant inverter 101a according to Patent Literature 1, since there is no discharge loss for the energy accumulated in the capacitance connected across both ends of the switching element 105 due to the switching of the switching element 105, a high-frequency switching operation is possible. Due to this advantage, the resonant inverter 101a in Patent Literature 1 is widely used as an RF power amplifier of a communication system and as a high-frequency switching power supply that has a rectifying and smoothing circuit attached to a latter stage. However, with the resonant inverter 101a according to Patent Literature 1, the voltage peak value applied across both ends of the switching element 105 during the period where the switching element 105 is off rises due to voltage resonance to around 3.6 times the DC input voltage V1.

Figure 15:
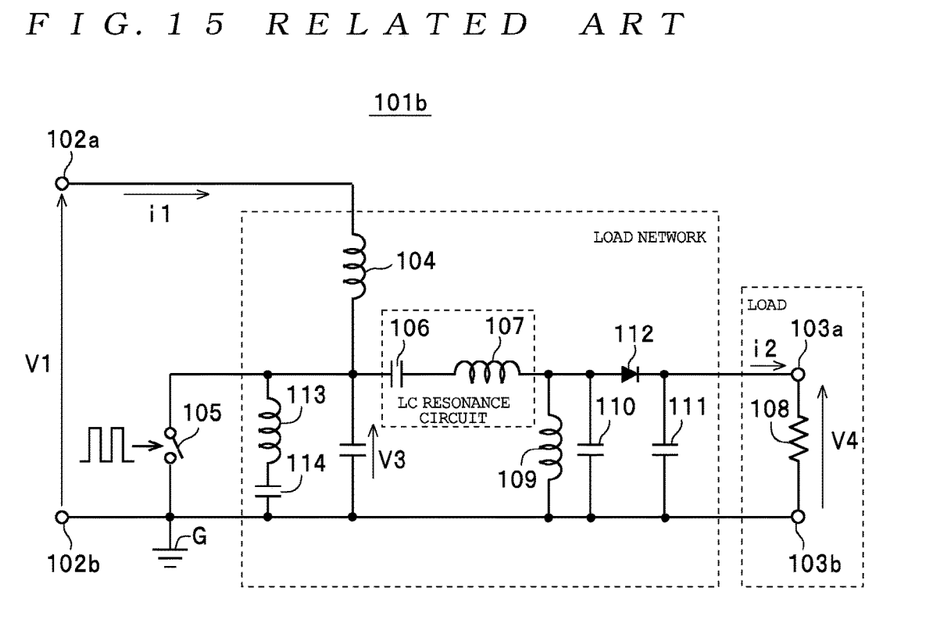
FIG. 15 schematically depicts the circuit configuration of a resonant converter according to Patent Literature 2.

On the other hand, as depicted in FIG. 15, Patent Literature 2 discloses a resonant converter 101b that maintains the inverter characteristics of the Patent Literature 1 but makes it possible to suppress the voltage peak value applied across both ends of the switching element 105 to around double the DC input voltage V1 by attaching an LC resonant circuit (a series circuit with an inductance 113 and a capacitance 114) that suppresses a second harmonic component of the switching frequency to both ends of the switching element 105. In addition to the construction of the load network of the resonant inverter 101a described above, the load network of the resonant converter 101b includes, together with the inductance 113 and the capacitance 114 described above, an AC-to-DC converter circuit (an LC resonance circuit constructed of an inductance 109 and a capacitance 110 connected in parallel, and a rectifying and smoothing circuit composed of a capacitor 111 and a diode 112 which includes a junction capacitance) disposed between the LC resonance circuit (a series circuit with the inductance 106 and the capacitance 107) of the resonant inverter 101a and the output terminals 103a and 103b. The DC input voltage V1 inputted across the DC input terminals 102a and 102b is converted to the DC output voltage V4, which is outputted from the output terminals 103a and 103b to the load resistor 108. Note that configurations that are the same as the resonant inverter 101a have been assigned the same reference numerals and duplicated description thereof is omitted. With the resonant converter 101b according to Patent Literature 2, in the same way as the resonant inverter 101a according to Patent Literature 1, high-frequency switching operations up to the RF band are possible.

SUMMARY OF THE INVENTION

However, with the resonant inverter 101a according to Patent Literature 1 in the related art, the voltage peak value applied across both ends of the switching element 105 during operation rises due to voltage resonance to around 3.6 times the DC input voltage V1. For this reason, as the switching element 105, it is necessary to use a switching element with a high withstand voltage, and therefore a high On-resistance, relative to the DC input voltage V1, which causes the problems of an increase in cost and a fall in conversion efficiency.

On the other hand, with the resonant converter 101b according to Patent Literature 2 in the related art, by attaching the LC resonance circuit (a series circuit with the inductance 113 and the capacitance 114) that suppresses the second harmonic component of the switching frequency to both ends of the switching element 105, it is possible to suppress the voltage peak value applied across both ends of the switching element 105 to around double the DC input voltage V1. However, since the LC resonance circuit described above that suppresses the second harmonic component is distributed independently of the various components inside the converter, there is the problem of a large influence on the routing of the mounting pattern when switching operations are to be performed at high frequency. Due to this influence, there is also the problem that it is difficult to optimize and stabilize the resonant switching operation. There are additional problems of an increase in the component mounting cost and an increase in the component mounting area, resulting in difficulty in reducing the manufacturing cost, miniaturizing the apparatus, and making adjustments to optimize the operation of the entire apparatus.

The present invention was conceived in view of the problems described above, and has an object of providing a power conversion apparatus that is small, low cost, and has a high conversion efficiency with the advantageous characteristics of the resonant inverter or the resonant converter according to the related art described above by changing the input inductance required for a conventional power conversion apparatus such as the resonant inverter or the resonant converter from a single component in the form of an inductor to an LC resonance circuit that is a combination of a capacitance and an inductance such that the frequency characteristics Z of the impedance (hereinafter, the expression "optimized impedance characteristics Z" indicates the frequency characteristics of the impedance) are optimized for the operating conditions of the apparatus, in particular, the oscillation frequency.

To achieve the stated object, the power conversion apparatus according to the present invention comprises plus and minus direct current (DC) input terminals into which a DC voltage is inputted; two alternating current (AC) output terminals that output an AC voltage; a switching element; a first resonant capacitance connected between both ends of the switching element; a first LC resonance circuit that is connected in series together with the switching element between the AC output terminals; and a second LC resonance circuit connected in series together with the switching element between the DC input terminals, wherein the first LC resonance circuit includes a current path including a series circuit with an inductance and a capacitance, and the second LC resonance circuit which includes a first connector portion connected to one DC input terminal out of the two DC input terminals and a second connector portion connected to the switching element, and has a first current path, which includes an inductance, and a second current path, which includes a series circuit with an inductance and a capacitance, formed between the first connector portion and the second connector portion. Also, the second LC resonance circuit described above may be a composite resonant impedance element configured by internally incorporating an inductance and a capacitance.

The power conversion apparatus according to the present invention constructs the switching element performs a Class E switching operation.

The power conversion apparatus according to the present invention constructs, in the second LC resonance circuit, frequency characteristics of an impedance between the first connector portion and the second connector portion have two resonant frequencies, a first resonant frequency in a lower frequency band out of the two resonant frequencies is higher than a switching frequency of the switching element, and a second resonant frequency in a higher frequency band out of the two resonant frequencies is around double the switching frequency, and the second LC resonance circuit is formed so that the impedance has a local maximum at the first resonant frequency and has a local minimum at the second resonant frequency.

In this configuration, the second LC resonance circuit internally includes a first inductance, a second inductance, and a second capacitance, the first inductance is connected between the first connector portion and the second connector portion, and a series circuit with the second inductance and the second capacitance is connected between the first connector portion and the second connector portion.

Alternatively, the second LC resonance circuit internally includes a third inductance, a fourth inductance, and a third capacitance, and a series circuit with the third inductance and the fourth inductance is connected between the first connector portion and the second connector portion, and the third capacitance is connected in parallel to the fourth inductance.

The power conversion apparatus according to the present invention constructs, in the second LC resonance circuit, there are two further resonant frequencies in the frequency characteristics of the impedance that are higher than the second resonant frequency, a third resonant frequency in a lower frequency band out of the two further resonant frequencies that is over double but less than four times the switching frequency, and a fourth resonant frequency in a high frequency band out of the two further resonant frequencies that is around four times the switching frequency, and the second LC resonance circuit is formed so that the impedance has a local maximum at the third resonant frequency and has a local minimum at the fourth resonant frequency.

In this configuration, the second LC resonance circuit internally includes a fifth inductance, a sixth inductance, a seventh inductance, a fourth capacitance, and a fifth capacitance, and the fifth inductance is connected between the first connector portion and the second connector portion, and a series circuit with the sixth inductance and the fourth capacitance is connected between the first connector portion and the second connector portion, and a series circuit with the seventh inductance and the fifth capacitance is connected between the first connector portion and the second connector portion.

Alternatively, the second LC resonance circuit internally includes an eighth inductance, a ninth inductance, a tenth inductance, a sixth capacitance, and a seventh capacitance, and a series circuit with the eighth inductance, the ninth inductance, and the tenth inductance is connected between the first connector portion and the second connector portion, and the sixth capacitance is connected in parallel to the ninth inductance, and the seventh capacitance is connected in parallel to the tenth inductance.

Alternatively, the second LC resonance circuit internally includes an eleventh inductance, a twelfth inductance, a thirteenth inductance, an eighth capacitance, and a ninth capacitance, and the eleventh inductance, the twelfth inductance, and the thirteenth inductance are connected in order in series between the first connector portion and the second connector portion, and the eighth capacitance is connected in parallel to a series circuit with the twelfth inductance and the thirteenth inductance, and the ninth capacitance is connected in parallel to the thirteenth inductance.

Alternatively, the second LC resonance circuit internally includes a fourteenth inductance, a fifteenth inductance, a sixteenth inductance, a tenth capacitance, and an eleventh capacitance, and the fourteenth inductance is connected between the first connector portion and the second connector portion, and the tenth capacitance, the eleventh capacitance, and the sixteenth inductance are connected in order in series between the first connector portion and the second connector portion, and the fifteenth inductance is connected in parallel to a series circuit with the eleventh capacitance and the sixteenth inductance.

Alternatively, the second LC resonance circuit internally includes a seventeenth inductance, an eighteenth inductance, a nineteenth inductance, a twelfth capacitance, and a thirteenth capacitance, and the seventeenth inductance, the twelfth capacitance, and the eighteenth inductance are connected in order in series between the first connector portion and the second connector portion, and the nineteenth inductance is connected in parallel to a series circuit with the twelfth capacitance and the eighteenth inductance, and the thirteenth capacitance is connected in parallel to the eighteenth inductance.

Alternatively, the second LC resonance circuit internally includes a twentieth inductance, a twenty-first inductance, a twenty-second inductance, a fourteenth capacitance, and a fifteenth capacitance, and the twentieth inductance, the fourteenth capacitance, and the twenty-first inductance are connected in order in series between the first connector portion and the second connector portion, and the twenty-second inductance and the fifteenth capacitance are respectively connected in parallel to a series circuit with the fourteenth capacitance and the twenty-first inductance.

Alternatively, the second LC resonance circuit internally includes inductances that are magnetically coupled.

The power conversion apparatus according to the present invention constructs, the capacitance and the inductance included in the first LC resonance circuit are composed of a sixteenth capacitance and a twenty-third inductance that are disposed so as to be distributed between a first path between one end of the switching element and one AC output terminal out of the two AC output terminals and a second path between another end of the switching element and another AC output terminal out of the two AC output terminals.

The power conversion apparatus according to the present invention comprises any of the power conversion apparatus as described above; and an AC-to-DC converter circuit that includes a third LC resonance circuit and a rectifier circuit, is connected between the AC output terminals of the power conversion apparatus, converts the AC voltage outputted from the AC output terminals to a DC voltage, and outputs the DC voltage.

With the power conversion apparatus according to the present invention, by changing the input inductance in a power conversion apparatus such as a resonant inverter or a resonant converter from a single component in the form of an inductor to the second LC resonance circuit (a composite resonant circuit with the optimized impedance characteristics Z) that has a first current path, which includes an inductance, and a second current path, which includes a series circuit with an inductance and a capacitance, formed between the first connector portion and the second connector portion (that is, where two current paths are formed in parallel between the first connector portion and the second connector portion), it is possible to easily optimize the characteristics of a resonant inverter or a resonant converter.

As a result, it is possible to easily suppress the voltage peak value applied across both ends of the switching element to around double the DC input voltage, so a low withstand voltage and therefore low On-resistance switching element can be used. As a result, it is possible to provide a highly efficient power conversion apparatus.

Since part of the functional configuration relating to a resonance operation of a resonant inverter or a resonant converter can be collectively provided in the second LC resonance circuit, it is possible to construct a two-terminal composite resonant impedance element. When switching operations are to be performed in particular at high frequency, various adverse effects occur when the routing of a pattern on which the high-frequency switching current flows is long. According to the present technology, it is possible to make the routing of a pattern extremely short and compactly design a switching circuit (a circuit including the switching element, the first resonant capacitance, and the second LC resonance circuit), and as a result, it is easy to suppress the influence of noise, such as effects due to receiving noise and conversely the discharging of noise. Also, by gathering the components together, it is possible to magnetically couple a plurality of required inductances, which reduces the number of magnetic cores and facilitates both reductions in cost and optimization. When there are fluctuations in the core characteristics of inductor cores, it is possible to suppress the differences in fluctuations in the element characteristics of individual inductors, which contributes to stabilization of operations. It is possible to further reduce the manufacturing cost, miniaturize the apparatus, and optimize operations of the apparatus.

It should be noted that the disclosure of the present invention relates to a content of Japanese Patent Application 2016-226110 that was filed on 21 Nov. 2016 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Several preferred embodiments of the present invention will now be described. Note that the present invention is not limited to the following embodiments. The component elements described below include equivalent component elements that should be apparent to those of skill in the art, and such component elements may be combined as appropriate.

Preferred embodiments of the present invention will now be described in detail with reference to the drawings. Note that in the description of the drawings, elements that are the same have been assigned the same reference numerals and duplicated description thereof is omitted.

First, the overall configuration of a power conversion apparatus according to a preferred embodiment of the present invention will be described with reference to FIG. 1, with an inverter apparatus 1a as one example of a power conversion apparatus. The inverter apparatus 1a is equipped with a load network 4 and a switching element 5.

The inverter apparatus 1a is also equipped with a pair of DC input terminals 2a and 2b (hereinafter collectively referred to as the "DC input terminals 2" when no distinction is made) and a pair of AC output terminals 3a and 3b (hereinafter collectively referred to as the "AC output terminals 3" when no distinction is made).

In more detail, the DC input voltage (DC voltage) V1 is inputted across the pair of DC input terminals 2a and 2b, with the DC input terminal 2b, which is connected to a reference potential (in the present embodiment, the common ground G), as the low-potential side. An AC output voltage (AC voltage) V2 is outputted across the pair of AC output terminals 3a and 3b, with the AC output terminal 3b connected to the reference potential (in the present embodiment, the common ground G) as a reference and the potential of an AC output terminal 3a changing between positive and negative. A load resistance 6 is connected to the inverter apparatus 1a.

The switching element 5 is constructed of a MOSFET, a bipolar transistor, or the like. Due to the switching element 5 switching on and off, the inverter apparatus 1a converts the DC input voltage V1 inputted from the DC input terminals 2 to the AC output voltage V2 and outputs the AC output voltage V2 from the AC output terminals 3.

The load network 4 includes a second LC resonance circuit 41 with optimized impedance characteristics Z, a first resonant capacitance 42 (including the output capacitance of the switching element 5), and a first LC resonance circuit 43, and is a load that is responsive to on/off switching of the switching element 5.

In this configuration, the load resistor 6 described above is connected between the AC output terminals 3a and 3b and is supplied with the AC output voltage V2 converted from the DC input voltage V1 inputted into the DC input terminals 2.

The second LC resonance circuit 41 is a one-port network with two external connection terminals (a first connector portion 41a and a second connector portion 41b) or a two-terminal element such as a composite resonant impedance element. The second LC resonance circuit 41 internally includes a plurality of inductances and at least one capacitance, has two current paths in parallel, a current path constructed in equivalent terms of only an inductance provided between the two connector portions 41a and 41b (one example of a first current path including an inductance) and a current path constructed of only a series circuit that is equivalent to an inductance and a capacitance (one example of a second current path that includes a series circuit with an inductance and a capacitance). The second LC resonance circuit 41 also has the optimized impedance characteristics Z as a frequency characteristic for the impedance when looking across the connector portions 41a and 41b. The expression "composite resonant impedance element" above refers to a specific example of a second LC resonance circuit 41 where the inductance and capacitance included in the second LC resonance circuit 41 are incorporated in a single electronic component, and is a specific example of the second LC resonance circuit 41. One out of the connector portions 41a and 41b of the second LC resonance circuit 41 (in the present embodiment, the connector portion 41a) is connected to the DC input terminal 2a, and the other out of the connector portions 41a and 41b (in the present embodiment, the connector portion 41b) is connected to one end of the switching element 5. The other end of the switching element 5 is connected to the DC input terminal 2b. Accordingly, when the switching element 5 is ON, a DC current loop composed of the DC input terminal 2a→second LC resonance circuit 41→switching element 5→DC input terminal 2b is formed. In FIG. 1, although the loop given above is produced due to the second LC resonance circuit 41 being connected to the plus-side DC input terminal 2a out of the DC input terminals 2a and 2b, a configuration where the second LC resonance circuit 41 is connected to the minus-side DC input terminal 2b is also possible, and in this case a DC current loop composed of the DC input terminal 2a→switching element 5→second LC resonance circuit 41→DC input terminal 2b is formed.

Although the first resonant capacitance 42 is a resonant capacitance for resonant switching that is connected to both ends of the switching element 5, when the switching element 5 is a semiconductor element, the first resonant capacitance 42 may include the capacitance of junctions in the switching element 5 and may be composed of only the capacitance of such junctions.

A first specific example of the first LC resonance circuit 43 includes a sixteenth capacitance 431 and a twenty-third inductance 432, with the sixteenth capacitance 431 and the twenty-third inductance 432 being connected in series on a path that connects both ends of the switching element 5 and the AC output terminals 3a and 3b to each other. In the inverter apparatus 1a in FIG. 1, as one example, one end of the first LC resonance circuit 43 (as one example, the twenty-third inductance 432-side end of the series circuit composed of the sixteenth capacitance 431 and the twenty-third inductance 432) is connected to the AC output terminal 3a, and the other end of the first LC resonance circuit 43 (as one example, the other end on the sixteenth capacitance 431 side of the series circuit composed of the sixteenth capacitance 431 and the twenty-third inductance 432) is connected to one end of the switching element 5, and the other end of the switching element 5 is connected to the AC output terminal 3b. Accordingly, when the switching element is on, an AC current loop composed of the AC output terminal 3a↔the first LC resonance circuit 43↔the switching element 5↔the AC output terminal 3b is formed. In FIG. 1, although the loop given above is produced due to the first LC resonance circuit 43 being connected to the AC output terminal 3a, a configuration where the first LC resonance circuit 43 is connected to the AC output terminal 3b is also possible, and in this case an current loop composed of the AC output terminal 3a↔the switching element 5↔the first LC resonance circuit 43↔the AC output terminal 3b is formed. Also, it is sufficient for the sixteenth capacitance 431 and the twenty-third inductance 432 included in the first LC resonance circuit 43 to be connected in series within the AC current loop, and in place of a configuration where these components are directly connected to one another, it is possible to use a configuration where these elements are connected having been split between a path from the AC output terminal 3a to the switching element 5 and a path from the switching element 5 to the AC output terminal 3b.

Next, the second LC resonance circuit (or a composite resonant impedance element) 41 with the optimized impedance characteristics Z depicted in FIG. 1 will be described. FIG. 2 is a parts diagram of the second LC resonance circuit (or composite resonant impedance element) 41 depicted in FIG. 1 when expressed as a two-terminal black box to maintain security over information on the actual element configuration inside. The content of the black box includes an inductance, such as an inductor with a mutual inductance, and a capacitance, such as a capacitor.

Figure 1:
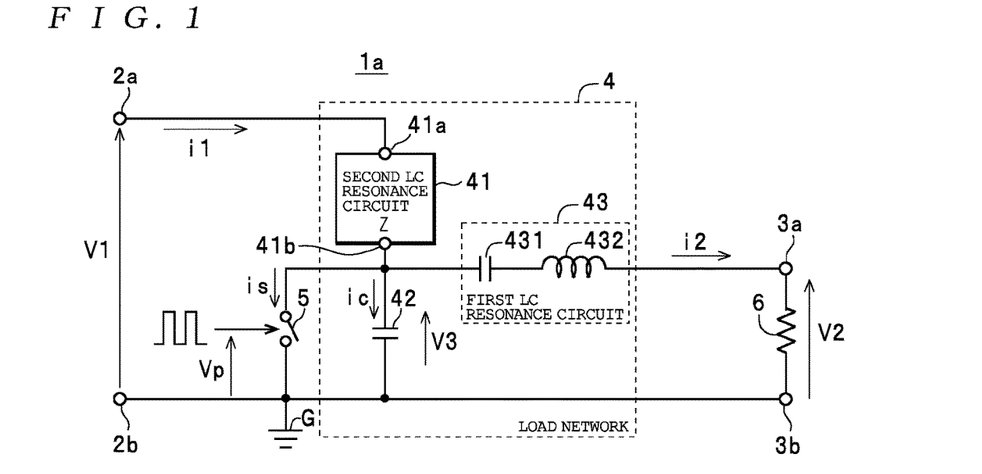
FIG. 1 is a block diagram schematically depicting the circuit configuration of an inverter apparatus $1a$ as a power conversion apparatus according to a first embodiment of the present invention.
Figure 2:
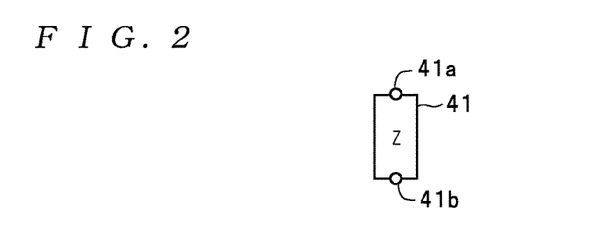
FIG. 2 is a block diagram of a configuration where internal elements that construct a second LC resonance circuit 41 with optimized impedance characteristics Z according to the present invention are collectively incorporated into a composite resonant impedance element.
Figure 3:
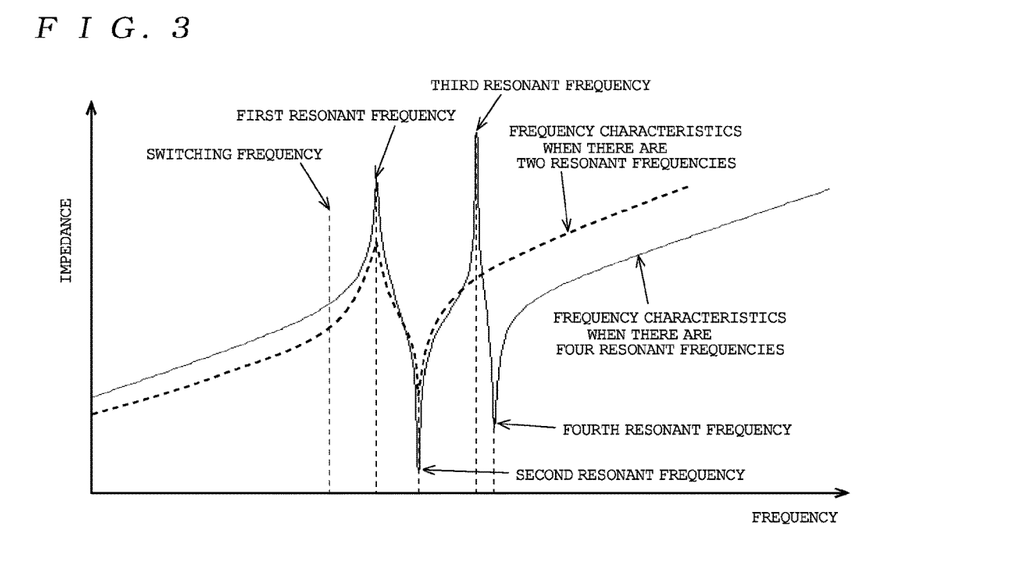
FIG. 3 is a diagram useful in explaining frequency characteristics for a case where the second LC resonance circuit 41 with the optimized impedance characteristics Z according to the present invention has two resonant frequencies and a case where there are four resonant frequencies.

As indicated by the broken line in FIG. 3, the second LC resonance circuit 41 (or composite resonant impedance element) in FIG. 1 can be configured by an LC resonance circuit where the frequency characteristics of the impedance have two resonant frequencies (a "first resonant frequency" and a "second resonant frequency"), and as indicated by the solid line in FIG. 3, can also be configured of an LC resonance circuit where the frequency characteristics of the impedance have two further resonant frequencies (a "third resonant frequency" and a "fourth resonant frequency") in addition to the above two resonant frequencies (the first resonant frequency and the second resonant frequency).

In the impedance characteristics of the second LC resonance circuit 41 with the optimized impedance characteristics Z, the first resonant frequency is higher than the switching frequency of the inverter apparatus 1a, the impedance reaches a local maximum at the first resonant frequency, the second resonant frequency is around double the switching frequency, and the impedance reaches a local minimum at the second resonant frequency.

Also, where there are four resonant frequencies, the impedance characteristics of the second LC resonance circuit 41 are such that the first resonant frequency and the second resonant frequency have the same impedance characteristics as with the configuration with two resonant frequencies described above, and the third resonant frequency and the fourth resonant frequency have impedance characteristics where the third resonant frequency is over double but less than four times the switching frequency, the impedance reaches a local maximum at the third resonant frequency, the fourth resonant frequency is around four times the switching frequency, and the impedance reaches a local minimum at the fourth resonant frequency. Although a voltage is generated across the switching element 5 at the same frequency as the switching frequency, since the second LC resonance circuit (or the composite resonant impedance element) 41 is configured so as to have impedance characteristics (the optimized impedance characteristics Z) where, as described above, the impedance reaches local minima at even number multiples of the switching frequency (in the examples described above, double, or double and four times), even-numbered components out of the harmonic components that constitute the waveform of the voltage generated across the two ends are attenuated by the second LC resonance circuit 41, leaving the fundamental wave component (the first harmonic component) and odd-numbered components (mainly the third harmonic component) to remain. As a result, it is possible to suppress the voltage generated across both terminals of the switching element 5 to around double the DC input voltage V1.

Next, specific examples of the circuit configuration of the second LC resonance circuit 41 depicted in FIG. 1 will be described with reference to FIGS. 4 to 11.

Figure 4:
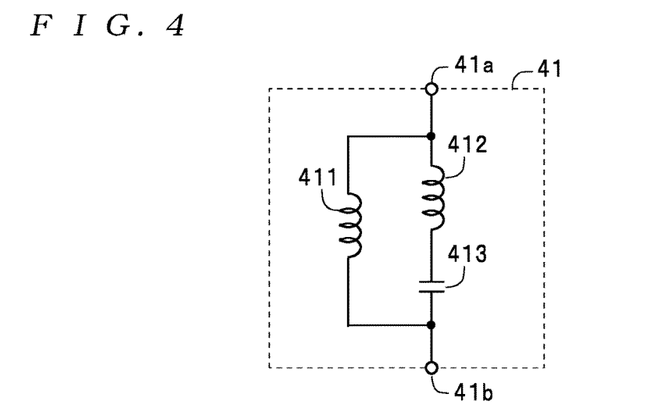
FIG. 4 is a diagram schematically depicting the circuit configuration of a second LC resonance circuit 41 according to the present invention with optimized impedance characteristics Z with one local minimum.

FIG. 4 is a first specific example of a second LC resonance circuit 41 with two resonant frequencies. This second LC resonance circuit 41 includes a first inductance 411, a second inductance 412, and a second capacitance 413, and is configured so that the first inductance 411 is connected between the first connector portion 41a and the second connector portion 41b and a series circuit composed of the second inductance 412 and the second capacitance 413 is also connected between the connector portions 41a and 41b.

Figure 5:
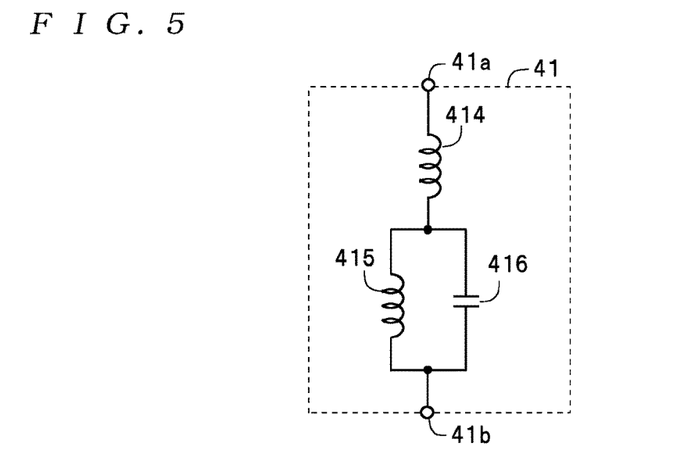
FIG. 5 is a diagram schematically depicting the circuit configuration of another second LC resonance circuit 41 according to the present invention with optimized impedance characteristics Z with one local minimum.

FIG. 5 depicts a second specific example of a second LC resonance circuit 41 with two resonant frequencies. This second LC resonance circuit 41 includes a third inductance 414, a fourth inductance 415, and a third capacitance 416, and is configured so that a series circuit composed of the third inductance 414 and the fourth inductance 415 is connected between the first connector portion 41a and the second connector portion 41b and the third capacitance 416 is connected in parallel to the fourth inductance 415.

Figure 6:
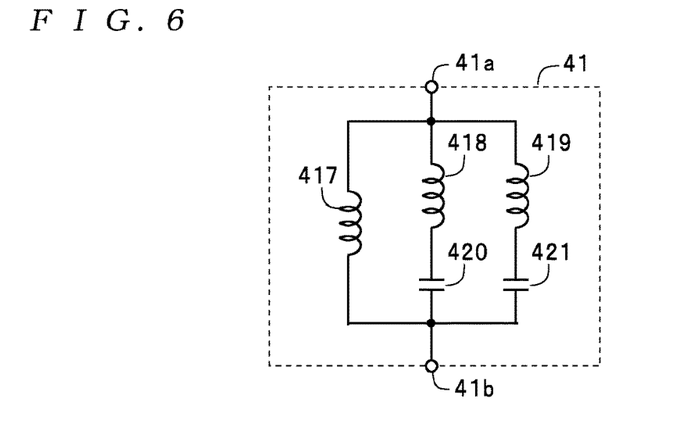
FIG. 6 is a diagram schematically depicting the circuit configuration of a second LC resonance circuit 41 according to the present invention with the optimized impedance characteristics Z with two local minima.

FIG. 6 depicts a third specific example of a second LC resonance circuit 41 with four resonant frequencies. This second LC resonance circuit 41 includes a fifth inductance 417, a sixth inductance 418, a seventh inductance 419, a fourth capacitance 420, and a fifth capacitance 421 and is configured so that the fifth inductance 417 is connected between the first connector portion 41a and the second connector portion 41b, a series circuit composed of the sixth inductance 418 and the fourth capacitance 420 is also connected between the connector portions 41a and 41b, and a series circuit composed of the seventh inductance 419 and the fifth capacitance 421 is also connected between the connector portions 41a and 41b.

Figure 7:
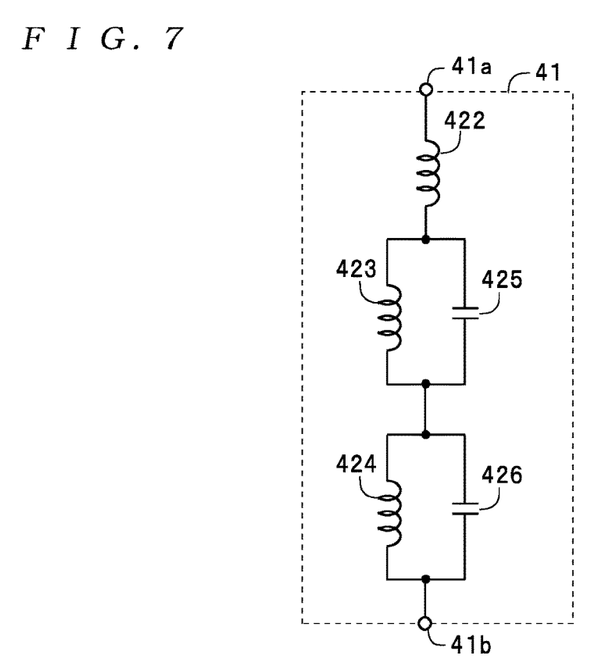
FIG. 7 is a diagram schematically depicting the circuit configuration of another second LC resonance circuit 41 according to the present invention with optimized impedance characteristics Z with two local minima.

FIG. 7 depicts a fourth specific example of a second LC resonance circuit 41 with four resonant frequencies. This second LC resonance circuit 41 includes an eighth inductance 422, a ninth inductance 423, a tenth inductance 424, a sixth capacitance 425, and a seventh capacitance 426, and is configured so that the eighth inductance 422, the ninth inductance 423, and the tenth inductance 424 are connected in series between the first connector portion 41a and the second connector portion 41b, the sixth capacitance 425 is connected in parallel to the ninth inductance 423, and the seventh capacitance 426 is connected in parallel to the tenth inductance 424.

Figure 8:
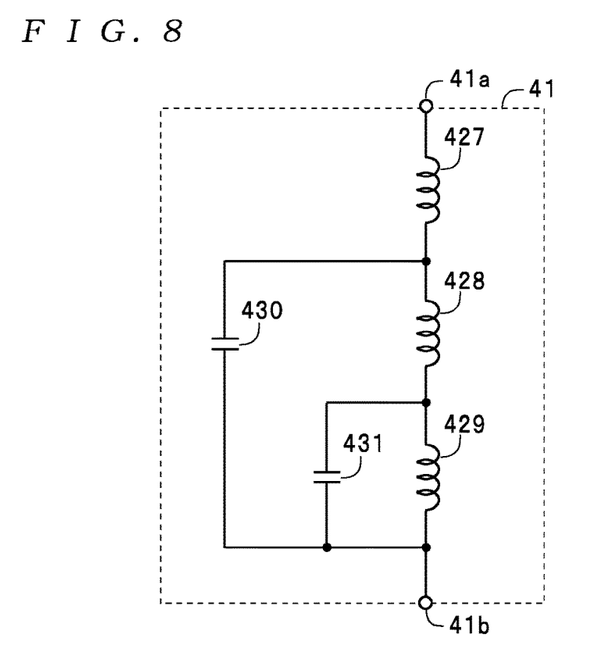
FIG. 8 is a diagram schematically depicting the circuit configuration of another second LC resonance circuit 41 according to the present invention with optimized impedance characteristics Z with two local minima.

FIG. 8 depicts a fifth specific example of a second LC resonance circuit 41 with four resonant frequencies. This second LC resonance circuit 41 includes an eleventh inductance 427, a twelfth inductance 428, a thirteenth inductance 429, an eighth capacitance 430, and a ninth capacitance 431, and is configured so that the eleventh inductance 427, the twelfth inductance 428, and the thirteenth inductance 429 are connected in that order in series between the first connector portion 41a and the second connector portion 41b, the ninth capacitance 431 is connected in parallel to the thirteenth inductance 429, and the eighth capacitance 430 is connected in parallel to a series circuit composed of the twelfth inductance 428 and the thirteenth inductance 429.

Figure 9:
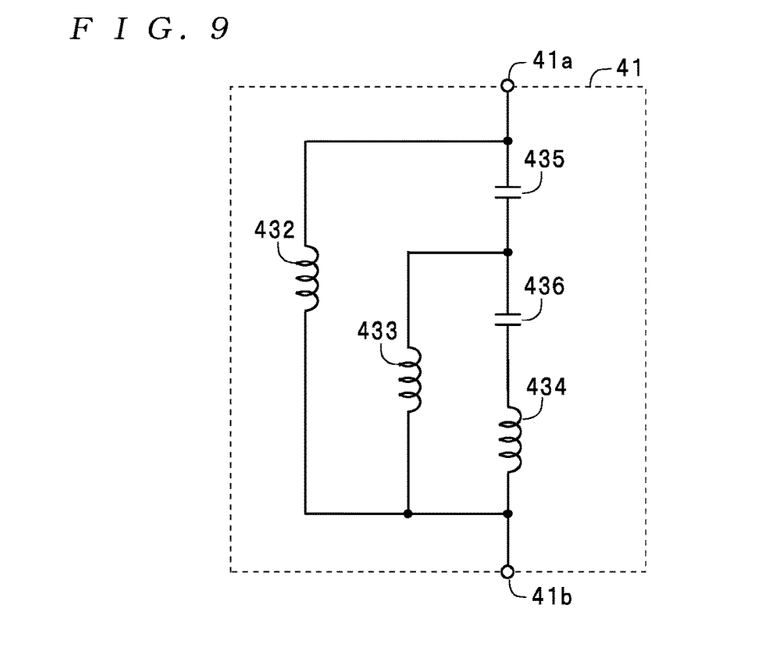
FIG. 9 is a diagram schematically depicting the circuit configuration of another second LC resonance circuit 41 according to the present invention with optimized impedance characteristics Z with two local minima.

FIG. 9 depicts a sixth specific example of a second LC resonance circuit 41 with four resonant frequencies. This second LC resonance circuit 41 includes a fourteenth inductance 432, a fifteenth inductance 433, a sixteenth inductance 434, a tenth capacitance 435, and an eleventh capacitance 436, and is configured so that the fourteenth inductance 432 is connected between the first connector portion 41a and the second connector portion 41b, the tenth capacitance 435, the eleventh capacitance 436, and the sixteenth inductance 434 are connected in that order in series between the first connector portion 41a and the second connector portion 41b, and the fifteenth inductance 433 is connected in parallel to a series circuit composed of the eleventh capacitance 436 and the sixteenth inductance 434.

Figure 10:
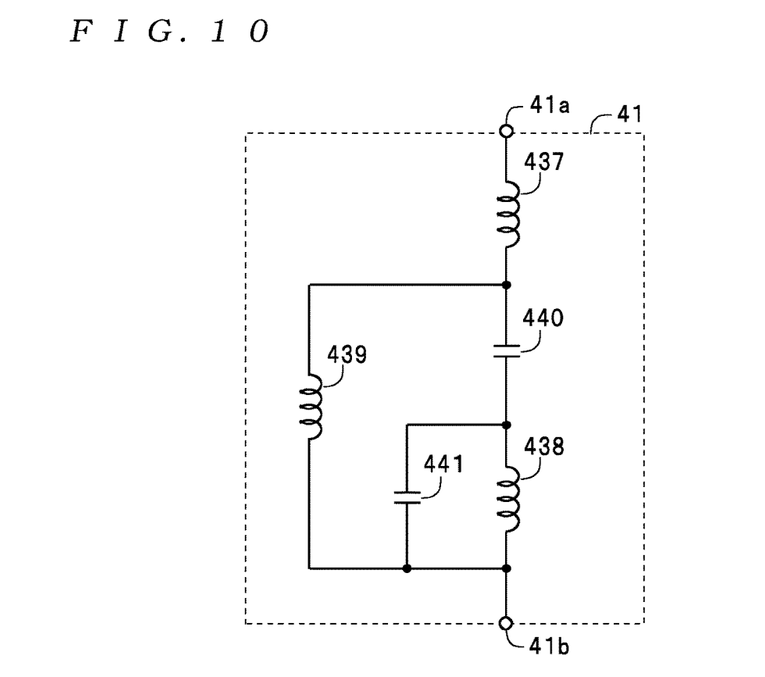
FIG. 10 is a diagram schematically depicting the circuit configuration of another second LC resonance circuit 41 according to the present invention with optimized impedance characteristics Z with two local minima.

FIG. 10 depicts a seventh specific example of a second LC resonance circuit 41 with four resonant frequencies. This second LC resonance circuit 41 includes a seventeenth inductance 437, an eighteenth inductance 438, a nineteenth inductance 439, a twelfth capacitance 440, and a thirteenth capacitance 441, and is configured so that the seventeenth inductance 437, the twelfth capacitance 440, and the eighteenth inductance 438 are connected in that order in series between the first connector portion 41a and the second connector portion 41b, the thirteenth capacitance 441 is connected in parallel to the eighteenth inductance 438, and the nineteenth inductance 439 is connected in parallel to a series circuit composed of the twelfth capacitance 440 and the eighteenth inductance 438.

Figure 11:
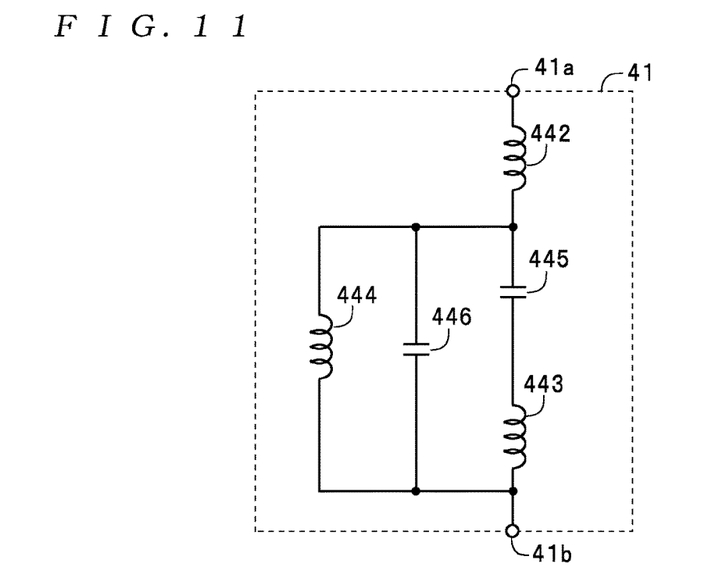
FIG. 11 is a diagram schematically depicting the circuit configuration of another second LC resonance circuit 41 according to the present invention with optimized impedance characteristics Z with two local minima.

FIG. 11 depicts an eighth specific example of a second LC resonance circuit 41 with four resonant frequencies. This second LC resonance circuit 41 includes a twentieth inductance 442, a twenty-first inductance 443, a twenty-second inductance 444, a fourteenth capacitance 445, and a fifteenth capacitance 446, and is configured so that the twentieth inductance 442, the fourteenth capacitance 445, and the twenty-first inductance 443 are connected in that order in series between the first connector portion 41a and the second connector portion 41b, and the twenty-second inductance 444 and the fifteenth capacitance 446 are respectively connected in parallel to a series circuit composed of the fourteenth capacitance 445 and the twenty-first inductance 443.

The plurality of inductors provided inside the second LC resonance circuit 41 may include inductors that are magnetically coupled. By doing so, a second LC resonance circuit or composite resonant impedance element that has a simple circuit configuration and includes four resonant frequencies is realized and the number of magnetic cores is reduced, which facilitates manufacturing at low cost and optimization. When there are fluctuations in the core characteristics of the inductor cores, it is possible to suppress the differences in fluctuations in the element characteristics of individual inductors, which contributes to stabilization of operations.

Figure 12:
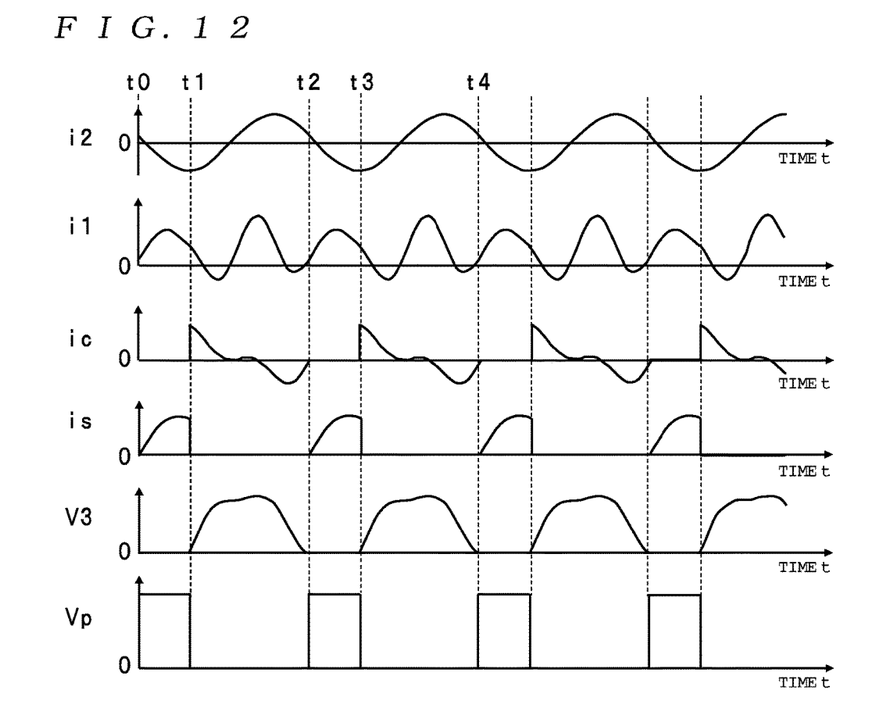
FIG. 12 is a waveform diagram useful in explaining the operation of the inverter apparatus $1a$.

Next, the fundamental operation of the inverter apparatus 1a depicted in FIG. 1 will be described in detail for the operation waveforms in each period with reference to the steady-state operation waveform diagram given in FIG. 12.

Out of the operation waveforms in each period, operations in a period from time t0 to time t1 are described first. At time t (=t0), a driving signal voltage Vp outputted from a control circuit that performs on/off control of the switching element 5 is at a high level to turn the switching element 5 on and maintains this high level until time t=t1. Accordingly, in the period from time t0 to time t1, the switching element 5 is on, the voltage V3 applied across both ends of the switching element 5 is zero, and a current is that flows to the first resonant capacitance 42 is zero. Due to the characteristics of the load network 4, the current is that flows in the switching element 5 gradually rises from zero. As the input current, since the current i1 that flows in the second LC resonance circuit 41 that has the optimized impedance characteristics Z is a resonant current, there is one positive resonance peak.

On the other hand, the output current i2 in this period is a negative sinusoidal current that has a minimum value at time t=t1.

Next, the operation in the period from time t1 to time t2 in FIG. 12 will be described. The driving signal voltage Vp supplied to the switching element 5 at time t=t1 becomes a low level to turn off in the switching element 5 and this low level is maintained until time t=t2. Accordingly, the switching element 5 is off during the period from time t1 to time t2 and, due to the characteristics of the load network 4, the voltage V3 applied across both ends of the switching element 5 immediately after the switching element 5 is turned off gradually rises due to resonance from zero to a resonance voltage that is around double the DC input voltage V1 and then falls to return to zero at time t=t2, so that the derivative with respect to time (the rate of change in voltage with respect to time) also becomes zero. In other words, the switching element 5 performs a Class E switching operation.

By turning off the switching element 5 during this period, the current is that flowed in the switching element 5 up to this time becomes zero, and there is a switch to the current is flowing in the first resonant capacitance 42. As the input current, the current i1 that flows in the second LC resonance circuit 41 that has the optimized impedance characteristics Z is a resonant current with two resonance peaks in the minus direction. On the other hand, the output current i2 rises immediately after reaching a minimum peak value at time t=t1. The output current i2 resonates during this period and has a maximum peak value.

The following period from time t2 to time t3 is the same as the operation from time t0 to time t1 described earlier and then the following period from time t3 to time t4 is the same as the operation from time t1 to time t2 described earlier. That is, the operation during the period from time t0 to time t2 is repeated during the following periods.

In this way, with the inverter apparatus 1a, by outputting the driving signal voltage Vp to the switching element 5 to repeatedly switch the switching element 5 on and off, it is possible to convert the DC input voltage V1 to the AC output voltage V2 with a high conversion efficiency. Here, by using the second LC resonance circuit 41 with the optimized impedance characteristics Z, the peak voltage applied across both ends of the switching element 5 is suppressed to an amplitude that is around double the DC input voltage V1. As a result, it is possible to lower the withstand voltage of the switching element 5, which makes it possible to select a switching element with a low On-resistance. As a result, it is possible to achieve a reduction in the conduction loss (or "on loss") of the switching element 5 and to further increase the conversion efficiency of the power conversion apparatus. Also, by using the second LC resonance circuit 41 with the optimized impedance characteristics Z, it becomes easier to optimize switching operations at high frequencies.

Examples where the on time of the driving signal voltage Vp used for on/off control of the switching element 5 is shorter than the off time have been described above. When the on time and the off time of the switching element 5 differ, there are cases where the operation voltage and operation current peak time of the various components will also differ.

Figure 13:
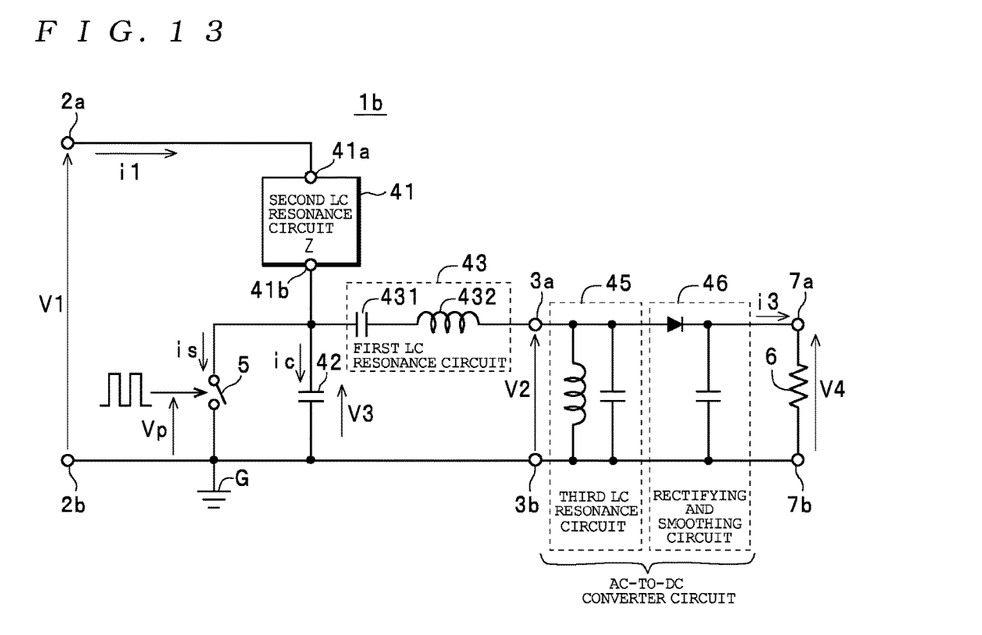
FIG. 13 schematically depicts the circuit configuration of a converter apparatus $1b$ as a power conversion apparatus according to a second embodiment of the present invention.

Also, an embodiment that uses the second LC resonance circuit 41 with the optimized impedance characteristics Z is not limited to the inverter apparatus 1a depicted in FIG. 1 (an example of an inverter circuit capable of converting an inputted DC voltage to an AC voltage) and can also be applied for example to a converter apparatus 1b depicted in FIG. 13 (one example of a power conversion apparatus that converts an input DC voltage to an output DC voltage).

A converter apparatus 1b in FIG. 13 is configured by connecting, to the AC output terminals 3a and 3b of the inverter apparatus 1a in FIG. 1, an AC-to-DC converting circuit (i.e., a converter circuit equipped with a third LC resonance circuit 45, which includes an inductance and a capacitance, and a rectifying and smoothing circuit 46, which includes a rectifying element and a smoothing element) that converts the AC output voltage V2 outputted from the AC output terminals 3a and 3b to a DC voltage signal V4 and outputs the DC voltage signal V4 from DC output terminals 7a and 7b. The minus-side DC input terminal 2b and the minus-side DC output terminal 7b are connected to a common ground G. The rest of the configuration is the same as in FIG. 1. The third LC resonance circuit 45 is configured by connecting a capacitance and an inductance in parallel, and the rectifying and smoothing circuit 46 is configured by connecting a rectifying element, such as a diode, including a junction capacitance, and a smoothing element, such as a capacitor, in series. The DC output voltage V4 is outputted from the rectifying and smoothing circuit 46 (more specifically, from the DC output terminals 7a and 7b that are connected to two terminals of the smoothing element of the rectifying and smoothing circuit 46). By doing so, when a load resistance 6 is connected to the DC output terminals 7a and 7b, the DC output voltage V4 is supplied to the load resistance 6. Also, the output current i3 in FIG. 13 is not an AC sine wave, but a DC current with a ripple component.

Note that the converter apparatus as a power conversion apparatus is not limited to the configuration of the converter apparatus 1b described above, and it is also possible to configure step-down, step-up, and step-up/step-down converter apparatuses by combining the first LC resonance circuit 43, the third LC resonance circuit 45, and the rectifying and smoothing circuit 46. By using a configuration where an insulating transformer is inserted in front of the rectifying and smoothing circuit 46, it is possible to construct a converter apparatus where an input DC voltage and an output DC voltage are insulated from each other.

Although the power conversion apparatus according to the present invention has been described above by way of various embodiments, the present invention is not limited to the embodiments described above and various modifications are also possible. As one example, as depicted in FIGS. 1 and 13, although embodiments where the DC input terminal 2b and an output terminal (the AC output terminal 3b or the DC output terminal 7b) are connected to a common ground G have been described above as a fundamental configuration, it is also possible to apply the present invention to a configuration where ground is not shared (that is, a configuration where one of the DC input terminal 2b and the output terminal (the AC output terminal 3b or the output terminal 7b) is not connected to a common ground G). With this configuration, the second LC resonance circuit (or the composite resonant impedance element) 41 is capable of being connected between the minus-side DC input terminal 2b and the switching element 5. Alternatively, as described above, it is possible to connect the first LC resonance circuit 43 to the common ground G side where the switching element 5 and an output terminal (the AC output terminal 3b and the DC output terminal 7b) are joined, and possible to connect the sixteenth capacitance 431 and the twenty-third inductance 432 included in the first LC resonance circuit 43 so as to be split (distributed) between a path from the AC output terminal 3a (or the DC output terminal 7a) to the switching element 5 and a path from the switching element 5 to the AC output terminal 3b (or the DC output terminal 7b).

What is claimed is:

1. A power conversion apparatus, comprising:
plus and minus direct current (DC) input terminals into which a DC voltage is inputted;
two alternating current (AC) output terminals that output an AC voltage;
a switching element;
a first resonant capacitance connected between both ends of the switching element;
a first LC resonance circuit that is connected in series together with the switching element between the two alternating current (AC) output terminals; and
a second LC resonance circuit connected in series together with the switching element between the plus and minus direct current (DC) input terminals,
wherein the first LC resonance circuit includes a current path including a series circuit with an inductance and a capacitance,
the second LC resonance circuit includes a first connector portion connected to one DC input terminal out of the plus and minus direct current (DC) input terminals and a second connector portion connected to the switching element, and has a first current path, which includes an inductance, and a second current path, which includes a series circuit with an inductance and a capacitance, formed between the first connector portion and the second connector portion,
in the second LC resonance circuit, frequency characteristics of an impedance between the first connector portion and the second connector portion have two resonant frequencies, a first resonant frequency in a lower frequency band out of the two resonant frequencies is higher than a switching frequency of the switching element, and a second resonant frequency in a higher frequency band out of the two resonant frequencies is around double the switching frequency, and
the second LC resonance circuit is formed so that the impedance has a local maximum at the first resonant frequency and has a local minimum at the second resonant frequency.

2. The power conversion apparatus according to claim 1, wherein in the second LC resonance circuit, there are two further resonant frequencies in the frequency characteristics of the impedance that are higher than the second resonant frequency, a third resonant frequency in a lower frequency band out of the two further resonant frequencies that is over double but less than four times the switching frequency, and a fourth resonant frequency in a high frequency band out of the two further resonant frequencies that is around four times the switching frequency, and
the second LC resonance circuit is formed so that the impedance has a local maximum at the third resonant frequency and has a local minimum at the fourth resonant frequency.

3. The power conversion apparatus according to claim 1, wherein the second LC resonance circuit internally includes a first inductance, a second inductance, and a second capacitance,
the first inductance is connected between the first connector portion and the second connector portion, and
a series circuit with the second inductance and the second capacitance is connected between the first connector portion and the second connector portion.

4. The power conversion apparatus according to claim 1, wherein the second LC resonance circuit internally includes a third inductance, a fourth inductance, and a third capacitance,
a series circuit with the third inductance and the fourth inductance is connected between the first connector portion and the second connector portion, and
the third capacitance is connected in parallel to the fourth inductance.

5. The power conversion apparatus according to claim 1, wherein the capacitance and the inductance included in the first LC resonance circuit are composed of a sixteenth capacitance and a twenty-third inductance that are disposed so as to be distributed between a first path between one end of the switching element and one AC output terminal out of the two AC output terminals and a second path between another end of the switching element and another AC output terminal out of the two AC output terminals.

6. A DC-DC power conversion apparatus, comprising:
the power conversion apparatus according to claim 1; and
an AC-to-DC converter circuit that includes a third LC resonance circuit and a rectifier circuit, is connected between the AC output terminals of the power conversion apparatus, converts the AC voltage outputted from the AC output terminals to a DC voltage, and outputs the DC voltage.

7. The power conversion apparatus according to claim 2, wherein the second LC resonance circuit internally includes a fifth inductance, a sixth inductance, a seventh inductance, a fourth capacitance, and a fifth capacitance,
the fifth inductance is connected between the first connector portion and the second connector portion,
a series circuit with the sixth inductance and the fourth capacitance is connected between the first connector portion and the second connector portion, and
a series circuit with the seventh inductance and the fifth capacitance is connected between the first connector portion and the second connector portion.

8. The power conversion apparatus according to claim 2, wherein the second LC resonance circuit internally includes an eighth inductance, a ninth inductance, a tenth inductance, a sixth capacitance, and a seventh capacitance,
a series circuit with the eighth inductance, the ninth inductance, and the tenth inductance is connected between the first connector portion and the second connector portion,
the sixth capacitance is connected in parallel to the ninth inductance, and
the seventh capacitance is connected in parallel to the tenth inductance.

9. The power conversion apparatus according to claim 2, wherein the second LC resonance circuit internally includes an eleventh inductance, a twelfth inductance, a thirteenth inductance, an eighth capacitance, and a ninth capacitance,
the eleventh inductance, the twelfth inductance, and the thirteenth inductance are connected in order in series between the first connector portion and the second connector portion,
the eighth capacitance is connected in parallel to a series circuit with the twelfth inductance and the thirteenth inductance, and
the ninth capacitance is connected in parallel to the thirteenth inductance.

10. The power conversion apparatus according to claim 2, wherein the second LC resonance circuit internally includes a fourteenth inductance, a fifteenth inductance, a sixteenth inductance, a tenth capacitance, and an eleventh capacitance,
the fourteenth inductance is connected between the first connector portion and the second connector portion,
the tenth capacitance, the eleventh capacitance, and the sixteenth inductance are connected in order in series between the first connector portion and the second connector portion, and
the fifteenth inductance is connected in parallel to a series circuit with the eleventh capacitance and the sixteenth inductance.

11. The power conversion apparatus according to claim 2, wherein the second LC resonance circuit internally includes a seventeenth inductance, an eighteenth inductance, a nineteenth inductance, a twelfth capacitance, and a thirteenth capacitance,
the seventeenth inductance, the twelfth capacitance, and the eighteenth inductance are connected in order in series between the first connector portion and the second connector portion,
the nineteenth inductance is connected in parallel to a series circuit with the twelfth capacitance and the eighteenth inductance, and
the thirteenth capacitance is connected in parallel to the eighteenth inductance.

12. The power conversion apparatus according to claim 2, wherein the second LC resonance circuit internally includes a twentieth inductance, a twenty-first inductance, a twenty-second inductance, a fourteenth capacitance, and a fifteenth capacitance,
the twentieth inductance, the fourteenth capacitance, and the twenty-first inductance are connected in order in series between the first connector portion and the second connector portion, and
the twenty-second inductance and the fifteenth capacitance are respectively connected in parallel to a series circuit with the fourteenth capacitance and the twenty-first inductance.

* * * * *